United States Patent
Furucrona et al.

(10) Patent No.: US 10,946,458 B2
(45) Date of Patent: Mar. 16, 2021

(54) CUTTING INSERT AND DRILLING TOOL

(71) Applicant: SANDVIK INTELECTUAL PROPERTY AB, Sandviken (SE)

(72) Inventors: Tomas Furucrona, Gavle (SE); Hakan P. Olsson, Sandviken (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 15/537,050

(22) PCT Filed: Nov. 27, 2015

(86) PCT No.: PCT/EP2015/077912
§ 371 (c)(1),
(2) Date: Jun. 16, 2017

(87) PCT Pub. No.: WO2016/096374
PCT Pub. Date: Jun. 23, 2016

(65) Prior Publication Data
US 2017/0341160 A1 Nov. 30, 2017

(30) Foreign Application Priority Data

Dec. 19, 2014 (EP) .................................... 14199383

(51) Int. Cl.
*B23B 27/16* (2006.01)
*B23B 51/04* (2006.01)

(52) U.S. Cl.
CPC ........ *B23B 51/048* (2013.01); *B23B 27/1614* (2013.01); *B23B 2200/0423* (2013.01); *B23B 2200/125* (2013.01); *B23B 2200/3681* (2013.01)

(58) Field of Classification Search
CPC .......... B23B 51/048; B23B 2200/0423; B23B 2200/125; B23B 2200/13681; B23B 27/145; B23B 2200/0419; B23B 27/1614; B23B 27/1622; B23C 2200/0416; B23C 5/202; B23C 5/207
See application file for complete search history.

(56) References Cited

U.S. PATENT DOCUMENTS

| 4,268,198 | A | | 5/1981 | Peters |
| 4,648,760 | A | * | 3/1987 | Karlsson ............... B23B 27/141 407/113 |
| 5,695,303 | A | | 12/1997 | Boianjiu et al. |

(Continued)

FOREIGN PATENT DOCUMENTS

| CN | 101549413 A | 10/2009 |
| CN | 103313814 A | 9/2013 |

(Continued)

*Primary Examiner* — Eric A. Gates
*Assistant Examiner* — Paul M Janeski
(74) *Attorney, Agent, or Firm* — Corinne R. Gorski (57) ABSTRACT

A cutting insert for a drilling tool is disclosed includes an insert body having a longitudinal direction. A first axial side extends across the longitudinal direction on opposite sides of the insert body. The insert body has a first cutting edge extending along a rim portion at an intersection between a first rake face and the first axial side. The first axial side includes a first relief face and a second relief face. The first and second relief faces form obtuse angles with an imaginary centre plane of the insert body.

16 Claims, 4 Drawing Sheets

(56) References Cited

U.S. PATENT DOCUMENTS

| | | |
|---|---|---|
| 5,800,100 A | 9/1998 | Krenzer |
| 8,827,605 B2 * | 9/2014 | Mergenthaler ........ B23B 51/048 407/114 |
| 9,132,485 B2 | 9/2015 | Ortlund et al. |
| 2010/0322732 A1 | 12/2010 | Mergenthaler et al. |
| 2013/0101364 A1 | 4/2013 | Dufour et al. |
| 2013/0294850 A1 * | 11/2013 | Park .................... B23C 5/06 407/47 |

FOREIGN PATENT DOCUMENTS

| | | |
|---|---|---|
| DE | 1602795 B | 4/1970 |
| DE | 69510790 T2 | 2/2000 |
| EP | 0758935 B1 | 7/1999 |
| EP | 2234746 B1 | 11/2011 |
| JP | H08118130 A | 10/1994 |
| RU | 2147491 C1 | 4/2000 |
| SU | 902986 A1 | 2/1982 |
| SU | 1263434 A1 | 10/1986 |
| WO | 95/25618 A | 3/1995 |
| WO | 95/030505 A1 | 11/1995 |
| WO | 2009095060 A1 | 8/2009 |
| WO | 2012099355 A2 | 7/2012 |
| WO | 2012131896 A | 10/2012 |

* cited by examiner

CUTTING INSERT AND DRILLING TOOL

RELATED APPLICATION DATA

This application is a § 371 National Stage Application of PCT International Application No. PCT/EP2015/077912 filed Nov. 27, 2015 claiming priority of EP Application No. 14199383.2, filed Dec. 19, 2014.

TECHNICAL FIELD

The present invention relates to a cutting insert for a drilling tool and to a drilling tool comprising a cutting insert.

BACKGROUND

WO 2009/095060 discloses a drilling tool having at least one chip groove for chip removal, having an insert seat which is formed at the end of the chip groove and which serves as a holder for a four times indexable insert. The insert is provided with at least one main cutting edge on each of two narrow sides and with at least one secondary cutting edge on each of two longitudinal sides. The insert has two face sides facing away from one another. The insert bears with its inactive face side on a holding surface of the insert seat, and a partial region of the inactive secondary cutting edge of its active face side lies in the insert seat at a distance from an adjoining side wall of the insert seat. A guide lip protrudes out of a top end of the side wall and covers a slot between the insert and the drilling tool. The cutting insert appears to have a 90 degree angle between a nominal plane of a face side and a relief face of a main cutting edge.

WO 95/030505 discloses a drill and inserts therefor, for drilling in metal in the smaller diameter range. The drill comprises of a drill shaft, a front end of which is provided with radially outer and inner inserts. Each insert has an elongated rhomboid shape, in which the short sides are broken in the middle to form a V with an internal obtuse angle. The inserts are arranged in the drill shaft in such a way that the longitudinal axis of the radially outer insert is inclined at an angle from a centre axis of the drill, which angle differs from the angle of inclination of the radially inner insert. Each insert comprises two cutting edges with positive cutting geometry. Each insert is differently shaped at its ends, which ends comprise a cutting edge. Thus, it is questionable whether each insert is indexable, at least to the extent that it is indexable in one and the same insert seat.

SUMMARY

It is an object of the present invention to provide an indexable cutting insert for a drilling tool which promotes chip evacuation.

According to an aspect of the invention, the object is achieved by a cutting insert for a drilling tool, the cutting insert comprising an insert body having a central longitudinal axis extending along a longitudinal direction of the insert body and an imaginary centre plane comprising the central longitudinal axis. The insert body has a pointed shape substantially in the longitudinal direction, and is generally defined by a top surface, a bottom surface, and a circumferential surface extending between the top surface and the bottom surface. The insert body at the top surface comprises a first rake face and the bottom surface comprises a second rake face. The insert body at the circumferential surface comprises a first radial side and a second radial side extending in the longitudinal direction on opposite sides of the insert body, and a first axial side and a second axial side extending across the longitudinal direction on opposite sides of the insert body. The insert body comprises a first cutting edge extending along a rim portion at an intersection between the first rake face and the first axial side, and a second cutting edge extending along a rim portion at an intersection between the second rake face and the first axial side. The first cutting edge comprises a first edge portion and a second edge portion extending at an obtuse angle to each other, and the second cutting edge comprises a third edge portion and a fourth edge portion extending at an obtuse angle to each other, the first, second, third, and fourth edge portions forming the said pointed shape. The first axial side comprises a first relief face and a second relief face, the first relief face extending along the first rake face on one side of the imaginary centre plane and the second relief face extending along the second rake face on an opposite side of the imaginary plane. The first relief face forms an obtuse angle with the centre plane, such that the insert body is longer in the longitudinal direction at the first cutting edge than adjacent to the centre plane. The second relief face forms an obtuse angle with the centre plane, such that the insert body is longer in the longitudinal direction at the second cutting edge than adjacent to the centre plane.

Since the first and second relief faces form an obtuse angle with the centre plane, a cutting insert having an acute wedge angle at both the first cutting edge and the second cutting edge is provided, for a drilling tool. Accordingly, the cutting insert is positionable with a neutral or at least only at a slight negative axial inclination angle in an insert seat of a relevant drilling tool. Thus, chip evacuation is promoted in the drilling tool. As a result, the above mentioned object is achieved. Moreover, the cutting insert is indexable in the insert seat.

The cutting insert may be configured to be attached to a tool body of a drilling tool. The cutting insert may be adapted to be held in a recess of the tool body forming an insert seat. The cutting insert is indexable, i.e. the cutting insert is positionable in at least two different positions in the insert seat of the drilling tool. The first cutting edge may extend from the insert seat to engage with a workpiece. The cutting insert may be configured to cut a radially outer portion of a hole being drilled in a workpiece.

The cutting insert may be manufactured from a material comprising e.g. one or more of cemented carbide, ceramics, cubic boron nitride, polycrystalline diamond, and/or cermet. The cutting insert may be coated with a surface coating comprising e.g. titanium nitride, titanium carbonitride, and/or aluminium oxide.

According to embodiments, the insert body may comprise a first transitional portion between the first axial side and the first radial side at the first rake face, and a second transitional portion between the first axial side and the first radial side at the second rake face. The insert body may comprise a first protrusion at the first transitional portion, the first cutting edge extending along at least a portion of the first protrusion. Seen in a view perpendicularly to the centre plane, the first protrusion may extend farther from the central longitudinal axis than the second transitional portion. In this manner a relief may be provided at the first protrusion when the cutting insert is arranged in a drilling tool, such that the first protrusion may cut an outer circumferential portion of a hole being drilled by the drilling tool. The first protrusion may extend in a direction outwardly from the longitudinal axis.

According to embodiments, seen in a view perpendicularly to the imaginary centre plane, a first corner portion between the first and second edge portions may be arranged on one side of the central longitudinal axis and a second corner portion between the third and fourth edge portions may be arranged on an opposite side of the central longitudinal axis. In this manner, when the first cutting edge engages with a workpiece, the second corner portion may be provided at substantially the same radius of a relevant drilling tool as the first corner portion. Thus, the cutting insert may require a less negative axial inclination angle for the second corner portion to stay clear of the workpiece as the drilling tool is rotated and fed into the workpiece, than if the second corner portion would be provided on the same radius in a drilling tool. Accordingly, chip evacuation is promoted.

According to embodiments, a first width of the cutting insert extends at the first rake face perpendicularly to the longitudinal axis and in parallel with the centre plane. The first width extends from the first protrusion to the second radial side. A partial width of the first width extends from the first protrusion to an intersection between the first and second edge portions at the first corner portion. The partial width may form 40-49% of the first width. In this manner the first corner portion, positioned on the first cutting edge at the intersection between the first and second edge portions, may be arranged on a same side of the central longitudinal axis as the first edge portion.

According to embodiments, the insert body may comprise a third transitional portion between the first axial side and the second radial side at the second rake face, and a fourth transitional portion between the first axial side and the second radial side at the first rake face. The insert body may comprise a second protrusion at the third transitional portion, the second cutting edge extending along at least a portion of the second protrusion. Seen in a view perpendicularly to the centre plane, the second protrusion may extend farther from the central longitudinal axis than the fourth transitional portion. In this manner a relief may be provided at the second protrusion when the cutting insert is arranged in a drilling tool, such that the second protrusion may cut an outer circumferential portion of a hole being drilled by the drilling tool with the second cutting edge engaging with the relevant workpiece. Thus, the cutting insert may be rotation symmetrical about the longitudinal axis. The second protrusion may extend in a direction outwardly from the longitudinal axis.

According to embodiments, the obtuse angle between the first and second edge portions may be within a range of 160+/−5 degrees, preferably approximately 160 degrees. In this manner sufficiently low cutting forces may be provided as the cutting insert arranged in a drilling tool is fed into a relevant workpiece, such that a length-diameter ratio of a relevant drilling tool as discussed below may be provided.

According to embodiments, a through hole may extend centrally through the insert body, substantially perpendicularly to the centre plane. In this manner the cutting insert may be fastened to a relevant drilling tool with e.g. a screw extending through the through hole.

According to embodiments, a first groove may extend along at least a portion of the first cutting edge in a primary land of the first rake face at the first cutting edge, and a second groove may extend along at least a portion of the second cutting edge in a primary land of the second rake face at the second cutting edge. In this manner an acute wedge angle may be provided at each of the first and second cutting edges. In this manner it is also possible to design the rake angle of the portion of the rake face that is closest to the cutting edge to suit the desired cutting operation. For example, the cutting insert can be designed to cut with a positive, neutral or negative rake angle. Moreover, in this manner a chip breaker may be provided at each of the first and second cutting edges.

According to embodiments, the insert body may be symmetrical such that the insert body at the second axial side is equal to the insert body at the first axial side. In this manner the cutting insert may be four times indexable. Thus, the cutting insert may be rotation symmetrical in the plane of the centre plane.

According to a further aspect of the present invention there is provided a drilling tool comprising an elongated tool body extending along a drill axis. The tool body comprises at least two chip flutes and one axial end portion thereof is provided with a peripherally arranged first insert seat for receiving a cutting insert and a centrally arranged second insert seat for receiving a cutting insert. The drilling tool comprises a cutting insert according to any aspect and/or embodiment discussed herein arranged in the first insert seat.

The drilling tool may be configured for use e.g. in a dedicated drill press, a milling machine, or a lathe. In the second insert seat, the drilling tool may be configured to receive a further cutting insert, other than a cutting insert according to aspects and/or embodiments discussed herein.

According to embodiments, the first insert seat may be provided with a tangential support surface, a radial support surface, and an axial support surface. The tangential support surface may extend from a first end portion at the said one axial end portion of the insert body to a second end portion at the axial support surface of the insert seat. Seen in a cutting direction of the drilling tool, the second end portion may extend ahead of the first end portion, such that the centre plane of the cutting insert extends at an angle of approximately 3 degrees to the drill axis. In this manner reliable chip evacuation from the cutting insert via one of the chip flutes may be provided when the drilling tool is in use. Accordingly, also the first, alternatively the second, rake face may extend at a rake angle of approximately −3 degrees.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

FIGS. 1a-1d illustrate various views of a cutting insert 2 according to embodiments. The cutting insert 2 is configured for use in a drilling tool, more specifically for forming a radially outer cutting insert of the drilling tool. The cutting insert 2 is four times indexable, i.e. the cutting insert 2 has four identical cutting edges, such that the cutting insert 2 may be placed in four different positions in the drilling tool, for each cutting edge at a time to engage with a workpiece.

The cutting insert 2 comprises an insert body 4 having a central longitudinal axis 6 extending along a longitudinal direction of the insert body 4 and an imaginary centre plane 8 comprising the central longitudinal axis 6. The insert body 4 has a pointed shape substantially in the longitudinal direction, and is generally defined by a top surface 10, a bottom surface 12, and a circumferential surface 14 extending between the top surface 10 and the bottom surface 12. The insert body 4 at the top surface 10 comprises a first rake face 16a and the bottom surface 12 comprises a second rake face 16b. The insert body 4 at the circumferential surface 14 comprises a first radial side 18a and a second radial side 18b extending in the longitudinal direction on opposite sides of the insert body 4. The insert body 4 at the circumferential surface 14 further comprises a first axial side 20a and a second axial side 20b extending across the longitudinal direction on opposite sides of the insert body 4.

Figure 1A:
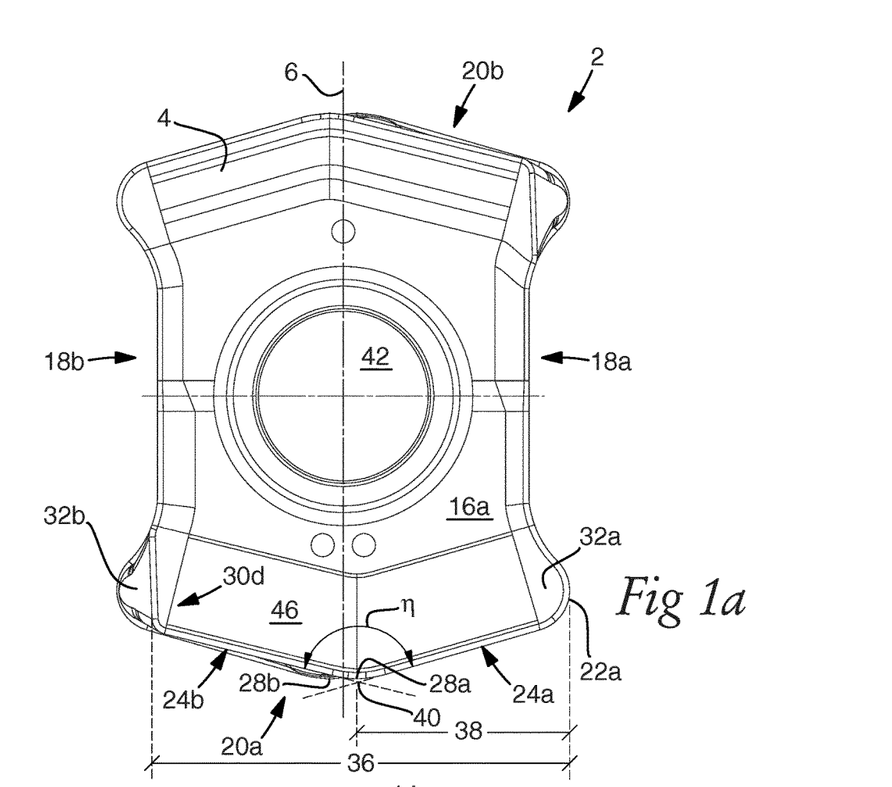
FIGS. 1a-1d illustrate various views of a cutting insert according to embodiments.

The insert body 4 comprises a first cutting edge 22a extending along a rim portion at an intersection between the first rake face 16a and the first axial side 20a. The insert body 4 comprises a second cutting edge 22b extending along a rim portion at an intersection between the second rake face 16b and the first axial side 20a. The first cutting edge 22a comprises a first edge portion 24a and a second edge portion 24b extending at an obtuse angle η to each other, see FIG. 1a. The second cutting edge 22b comprises a third edge portion 24c and a fourth edge portion 24d extending at an obtuse angle to each other. The obtuse angle between the third and fourth edge portions 24c, 24d is similar to the obtuse angle η between the first and second edge portions 24a, 24b, as illustrated in FIG. 1a. The first, second, third, and fourth edge portions 24a-24d form the pointed shape of the insert body 4. The first, second, third, and fourth edge portions 24a-24d may be linear edge portions, i.e. straight edge portions. Embodiments where the first, second, third, and fourth edge portions 24a-24d may be slightly curved as seen in a in a view perpendicularly to the centre plane and/or as seen in an end view towards the first axial side.

The first axial side 20a comprises a first relief face 26a and a second relief face 26b. The first relief face 26a extends along the first rake face 16a on one side of the imaginary centre plane 8 and the second relief face 26b extends along the second rake face 16b on an opposite side of the imaginary plane 8, see FIG. 1c. Accordingly, the first relief face 26a extends along the first cutting edge 22a and the second relief face 26b extends along the second cutting edge 22b.

Figure 1B:
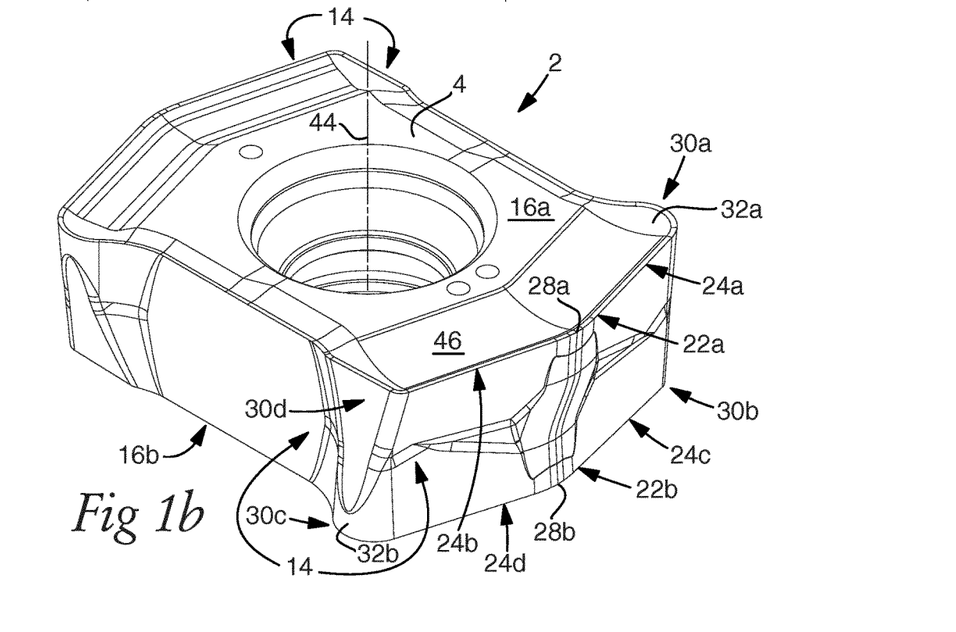
Figure 1C:
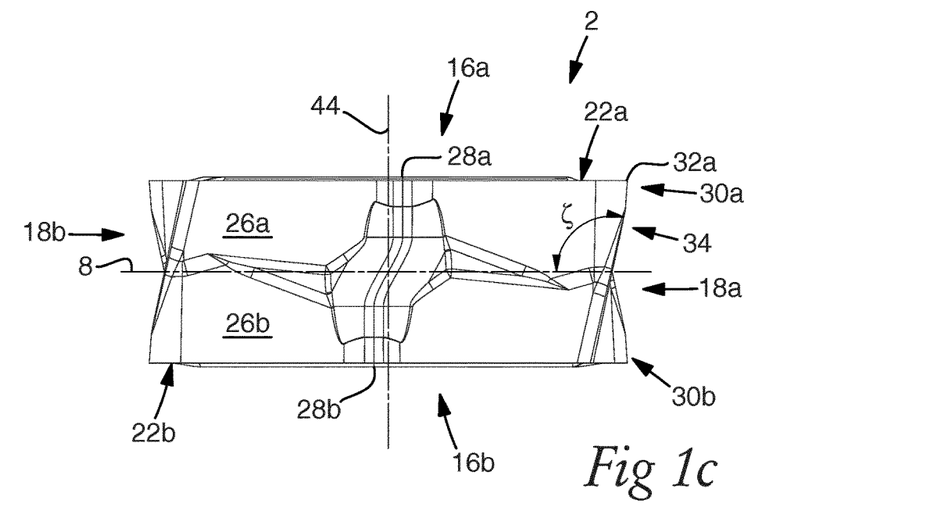
Figure 1D:
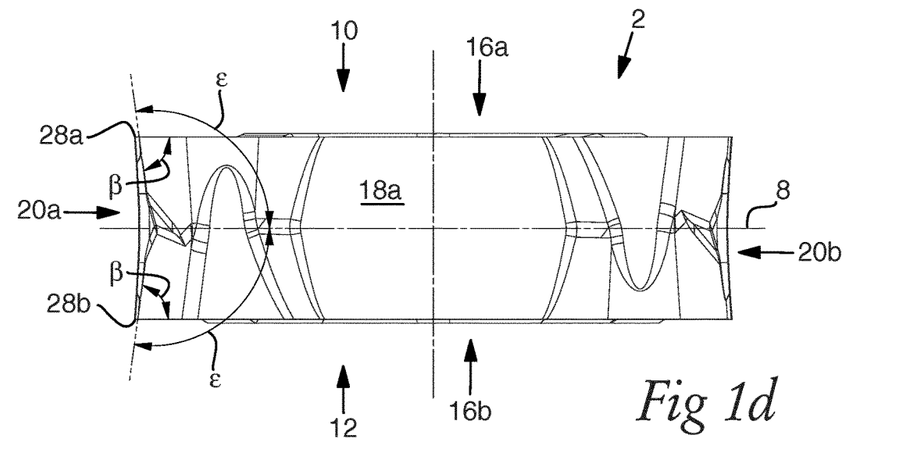

The first relief face 26a forms an obtuse angle ε with the centre plane 8, such that the insert body 4 is longer in the longitudinal direction at the first cutting edge 22a than adjacent to the centre plane 8, see FIG. 1d. Similarly, the second relief face 26b forms an obtuse angle ε with the centre plane 8, such that the insert body 4 is longer in the longitudinal direction at the second cutting edge 22b than adjacent to the centre plane 8. Accordingly, an acute wedge angle β is provided at both the first cutting edge 22a and the second cutting edge 22b.

The first and second relief faces 26a, 26b may extend from the first and second cutting edges 22a, 22b to the centre plane 8. Alternatively, the first and second relief faces 26a, 26b may extend over a shorter distance from the first and second cutting edges 22a, 22b towards the centre plane 8. The first and second relief faces 26a, 26b may be substantially flat or alternatively, slightly curved. In the latter case it is a tangent of the first and second relief faces 26a, 26b which forms the obtuse angle ε with the centre plane 8.

The first cutting edge 22a comprises a first corner portion 28a between the first and second edge portions 24a, 24b, see e.g. FIG. 1b. The second cutting edge 22b comprises a second corner portion 28b between the third and fourth corner portions 24c, 24d. Seen in a view perpendicularly to the centre plane 8, i.e. as in the view shown in FIG. 1a, the first corner portion 28a is arranged on one side of the central longitudinal axis 6 and the second corner portion 28b is arranged on an opposite side of the central longitudinal axis 6, see also FIG. 1c.

The obtuse angles ε with the centre plane 8 of the first and second relief faces 26a, 26b may vary along each of the relief faces 26a, 26b. In these embodiments for instance, the obtuse angles ε of the relief faces 26a, 26b at the edge portions 24a-24d is larger than at the first and second corner portions 28a, 28b, as may be seen e.g. in FIG. 1d. According to embodiments, the obtuse angle ε between the first relief face 26a and the centre plane 8 may be within a range of 91-95 degrees. The obtuse angles ε of the relief faces 26a, 26b at the edge portions 24a-24d may e.g. be within a range of 93-95 degrees and the obtuse angles ε of the relief faces 26a, 26b at the first and second corner portions 28a, 28b may e.g. be within a range of 91-94 degrees The insert body 4 comprises a first transitional portion 30a at the first rake face 16a, between the first axial side 20a and the first radial side 18a. The insert body 4 comprises a second transitional portion 30b at the second rake face 16b, between the first axial side 20a and the first radial side 18a. The insert body 4 comprises a first protrusion 32a at the first transitional portion 30a. The first cutting edge 22a extends along at least a portion of the first protrusion 32a. Seen in a view perpendicularly to the centre plane, i.e. as in the view illustrated in FIG. 1a, the first protrusion 32a extends farther from the central longitudinal axis 6 than the second transitional portion 30b. Seen in the same view, the first protrusion 32a extends in a direction outwardly from the longitudinal axis 6. See also FIG. 1c. The first protrusion 32a may be said to form a protuberance extending laterally farther from the longitudinal axis 6 than the first radial side 18a at its intersection with the first rake face 16a beyond the first protrusion 32a.

According to embodiments, a fifth relief face 34 extends along the first cutting edge 22a at the first protrusion 32a. The fifth relief face 34 extends at an obtuse angle ζ to the centre plane 8, see FIG. 1c.

At the first protrusion 32a thus, the first radial side 18a gradually transitions from the first protrusion 32a to the second transitional portion 30b. Accordingly, a relief is provided at the first protrusion 32a, such that the first cutting edge 22a at the first protrusion 32a may cut an outer circumferential portion of a hole in a workpiece. Moreover, if the first cutting edge 22a extends around the first protrusion 32a, the first protrusion 32a may cut the workpiece also while a relevant drilling tool is retracted from a hole being drilled. For instance, in a lathe this may be an option for cutting a finishing cut as the drilling tool is retracted from a drilled hole.

According to embodiments, the first protrusion 34a and the first corner portion 28a may be arranged on the same side of the longitudinal axis 6, see e.g. FIGS. 1a and 1c.

A first width 36 of the cutting insert 2 extends at the first rake face 16a perpendicularly to the longitudinal axis 6 and in parallel with the centre plane 8. The first width 36 extends from the first protrusion 32a to the second radial side 18b. A partial width 38 of the first width 36 extends from the first protrusion 32a to an intersection 40 between the first and second edge portions 24a, 24b at the first corner portion 28a. The partial width 38 forms 40-49% of the first width 36.

According to embodiments, the first width 36 may be within a range of 4-25 mm, preferably within a range of 4-10 mm.

Similarly to the first and second transitional portions 30a, 30b, the insert body 4 comprises a third transitional portion 30c between the first axial side 20a and the second radial side 18b at the second rake face 16b, and a fourth transitional portion 30d between the first axial side 20a and the second radial side 18b at the first rake face 16a. The insert body 4 comprises a second protrusion 32b at the third transitional portion 30c. The second cutting edge 22b extends along at least a portion of the second protrusion 32b. Seen in a view perpendicularly to the centre plane 8, the second protrusion 32b extends farther from the central longitudinal axis 6 than the fourth transitional portion 30d. The second protrusion 32b may be said to form a protuberance extending laterally farther from the longitudinal axis 6 than the second radial side 18b at its intersection with the second rake face 16b beyond the second protrusion 32b.

Thus, the cutting insert 2 may be rotation symmetrical about the longitudinal axis 6 at the first axial side 20a. A relief is provided at the second protrusion 32b. If the second cutting edge 22b extends around the second protrusion 32b, the second protrusion 32b may cut the workpiece also while a relevant drilling tool is retracted from a hole being drilled.

According to embodiments, the obtuse angle η between the first and second edge portions 24a, 24b may be within a range of 160+/−5 degrees, preferably approximately 160 degrees, as in the embodiments illustrated in FIGS. 1a-1c. Suitably, an obtuse angle between the third and fourth edge portions 24c, 24d is of the same size as the angle η between the first and second edge portions 24a, 24b.

A through hole 42 for attaching the cutting insert 2 to a relevant drilling tool and having a centre axis 44 extends centrally through the insert body 4, substantially perpendicularly to the centre plane 8.

A first groove 46 extends along at least a portion of the first cutting edge 22a in a primary land of the first rake face 16a at the first cutting edge 22a. A second groove extends along at least a portion of the second cutting edge 22b in a primary land of the second rake face 16b at the second cutting edge 22b. The second groove is not visible in FIGS. 1a-1d, but corresponds to the first groove 46.

As mentioned above, the cutting insert 2 is four times indexable. Accordingly, the insert body 4 is symmetrical such that the insert body 4 at the second axial side 20b is equal to the insert body 4 at the first axial side 20a. Thus, the cutting insert 2 is rotation symmetrical in the plane of the centre plane, i.e. about the centre axis 44 of the through hole 42.

Figure 2A:
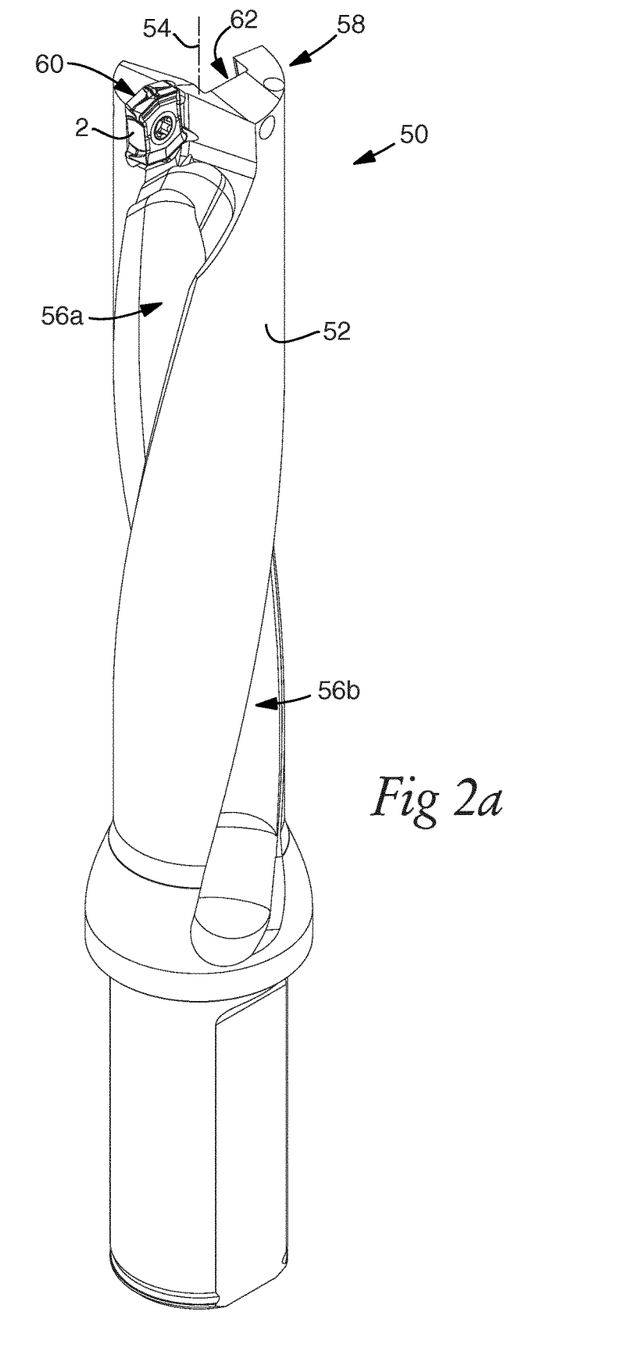
FIGS. 2a-2c illustrate a drilling tool according to embodiments.

FIG. 2a illustrates a drilling tool 50 according to embodiments. The drilling tool 50 comprises an elongated tool body 52 extending along a drill axis 54. The tool body 52 comprises at least two chip flutes 56a, 56b. An axial end portion 58 of the tool body 52 is provided with a peripherally arranged first insert seat 60 for receiving a cutting insert 2 and a centrally arranged second insert seat 62 for receiving a further cutting insert. The drilling tool 50 comprises a cutting insert 2 according to any aspect and/or embodiment discussed herein arranged in the first insert seat 60.

Figure 2B:
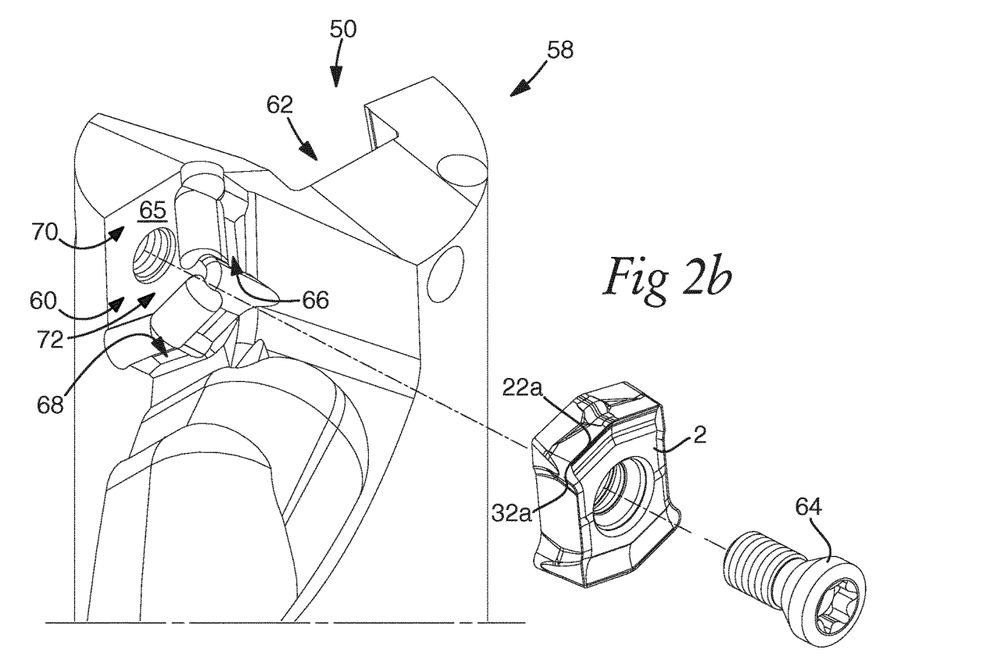
Figure 2C:
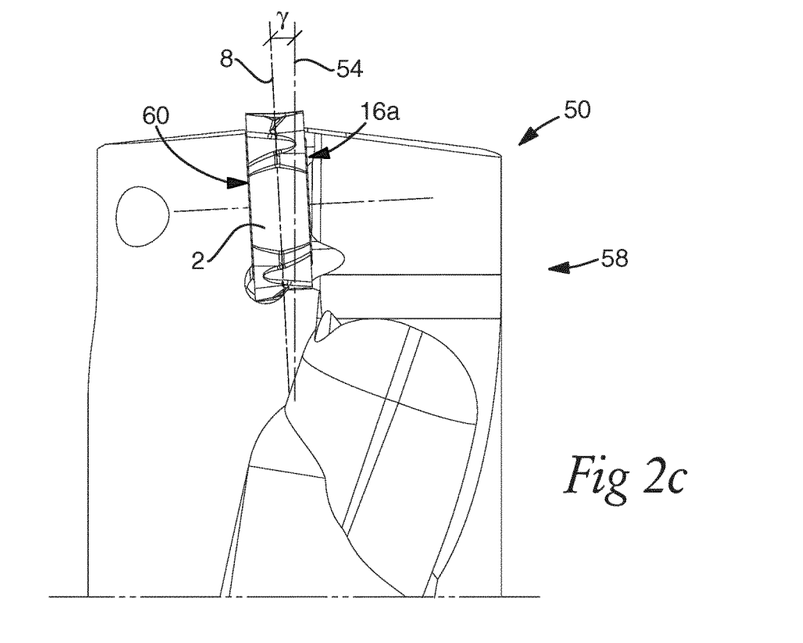

FIGS. 2b and 2c illustrate different views of the axial end portion 58 of the drilling tool 50 illustrated in FIG. 2a. The cutting insert 2 is configured to be attached to the tool body 52 by means of a screw 64. The cutting insert 2 is illustrated with its first cutting edge 22a extending from the first insert seat 60 to engage with a relevant workpiece. The cutting insert 2 is configured to cut a radially outer portion of a hole being drilled in the workpiece. Accordingly, the first protrusion 32a extends radially farthest from the drill axis 54. In the second insert seat 62 a further cutting insert is positionable, which further cutting insert is configured for cutting a centre portion of a hole being drilled.

The first insert seat 60 is provided with a tangential support surface 65, a radial support surface 66, and an axial support surface 68. The tangential support surface 64 extend from a first end portion 70 at the axial end portion 58 of the insert body 52 to a second end portion 72 at the axial support surface 68 of the first insert seat 60. Seen in a cutting direction of the drilling tool 50, the second end portion 72 extends ahead of the first end portion 70, such that the centre plane 8 of the cutting insert 2 extends at an axial inclination angle γ of approximately 3 degrees to the drill axis 54. Thus, also the first rake face 16a extends at a rake angle of approximately −3 degrees.

With reference to FIGS. 1a-1d, and as may be understood by the view illustrated in FIG. 2a, the second corner portion 28b of the second cutting edge 22b is provided at substantially the same radius of the drilling toll 50 as the first corner portion 28a. Accordingly, the second corner portion 28b stays clear of a relevant workpiece as the drilling tool 50 is rotated and fed into the workpiece with the first cutting edge 22a leading the cut.

According to embodiments, a drilling length of the drilling tool 50 may be up to 7 times a drilling diameter of the drilling tool 50. Due to the obtuse angle η between the first and second edge portions 24a, 24b being within a range of 160+/−5 degrees, see FIG. 1a, the cutting forces may be held within limits permitting such a length-diameter ratio of the drilling tool 50.

According to embodiments, a drilling diameter of the drilling tool 50 may be within a range of 15-65 mm, preferably within a range of 15-25 mm.

This invention should not be construed as limited to the embodiments set forth herein. A person skilled in the art will realize that different features of the embodiments disclosed herein may be combined to create embodiments other than those described herein, without departing from the scope of the present invention, as defined by the appended claims. Although the invention has been described with reference to example embodiments, many different alterations, modifications and the like will become apparent for those skilled in the art. The cutting insert may for instance comprise only the first and second cutting edges, and thus, may be only two times indexable. Therefore, it is to be understood that the foregoing is illustrative of various example embodiments and that the invention is defined only by the appended claims.

As used herein, the term "comprising" or "comprises" is open-ended, and includes one or more stated features, elements, steps, components or functions but does not preclude the presence or addition of one or more other features, elements, steps, components, functions or groups thereof.

The invention claimed is:

1. A cutting insert for a drilling tool, the cutting insert comprising an insert body having a central longitudinal axis extending along a longitudinal direction of the insert body and an imaginary centre plane including the central longitudinal axis, the insert body having a pointed shape substantially in the longitudinal direction, and being defined by a top surface, a bottom surface, and a circumferential surface extending between the top surface and the bottom surface, wherein the insert body at the top surface includes a first rake face and the bottom surface includes a second rake face, the insert body at the circumferential surface including a first radial side and a second radial side extending in the longitudinal direction on opposite sides of the insert body, the first radial side and the second radial side being parallel and each extending between the top and bottom surfaces and perpendicular to the centre plane, and a first axial side and a second axial side extending across the longitudinal direction on opposite sides of the insert body, and wherein the insert body includes a first cutting edge extending along a rim portion at an intersection between the first rake face and the first axial side, and a second cutting edge extending along a rim portion at an intersection between the second rake face and the first axial side, wherein the first cutting edge includes a first edge portion and a second edge portion extending at an obtuse angle to each other, and the second cutting edge includes a third edge portion and a fourth edge portion extending at an obtuse angle to each other, the first, second, third, and fourth edge portions forming said pointed shape, the first axial side including a first relief face and a second relief face, the first relief face extending along the first rake face on one side of the imaginary centre plane and the second relief face extending along the second rake face on an opposite side of the imaginary centre plane, wherein the first relief face forms an obtuse angle with the centre plane, such that the insert body is longer in the longitudinal direction at the first cutting edge than adjacent to the centre plane, and wherein the second relief face forms an obtuse angle with the centre plane, such that the insert body is longer in the longitudinal direction at the second cutting edge than adjacent to the centre plane, and wherein as seen in a view perpendicular to the imaginary centre plane, a first corner portion disposed between the first and second edge portions is arranged on one side of the central longitudinal axis and a second corner portion disposed between the third and fourth edge portions is arranged on an opposite side of the central longitudinal axis.

2. The cutting insert according to claim 1, wherein the insert body includes a first transitional portion disposed between the first axial side and the first radial side at the first rake face, and a second transitional portion disposed between the first axial side and the first radial side at the second rake face, wherein the insert body includes a first protrusion at the first transitional portion, the first cutting edge extending along at least a portion of the first protrusion and wherein as seen in a view perpendicular to the centre plane, the first protrusion extends farther from the central longitudinal axis than the second transitional portion.

3. The cutting insert according to claim 2, wherein a fifth relief face extends along the first cutting edge at the first protrusion, and wherein the fifth relief face extends at an obtuse angle to the centre plane.

4. The cutting insert according to claim 2, wherein the first protrusion and the first corner portion are arranged on the same side of the longitudinal axis.

5. The cutting insert according to claim 2, wherein a first width of the cutting insert extends at the first rake face perpendicularly to the longitudinal axis and in parallel with the centre plane, wherein the first width extends from the first protrusion to the second radial side, wherein a partial width of the first width extends from the first protrusion to an intersection between the first and second edge portions at the first corner portion, and wherein the partial width forms 40-49% of the first width.

6. The cutting insert according to claim 5, wherein the first width is within a range of 4-25 mm.

7. The cutting insert according to claim 1, wherein the insert body includes a third transitional portion between the first axial side and the second radial side at the second rake face, and a fourth transitional portion between the first axial side and the second radial side at the first rake face, wherein the insert body includes a second protrusion at the third transitional portion, the second cutting edge extending along at least a portion of the second protrusion, and wherein seen in a view perpendicularly to the centre plane, the second protrusion extends farther from the central longitudinal axis than the fourth transitional portion.

8. The cutting insert according to claim 1, wherein the obtuse angle between the first and second edge portions is within a range of 160+/−5 degrees.

9. The cutting insert according to claim 1, wherein the obtuse angle between the first relief face and the centre plane is within a range of 91-95 degrees.

10. The cutting insert according to claim 1, wherein a through hole extends centrally through the insert body, substantially perpendicular to the centre plane.

11. The cutting insert according to claim 1, wherein a first groove extends along at least a portion of the first cutting edge in a primary land of the first rake face at the first cutting edge, and wherein a second groove extends along at least a portion of the second cutting edge in a primary land of the second rake face at the second cutting edge.

12. The cutting insert according to claim 1, wherein the insert body is symmetrical such that the insert body at the second axial side is equal to the insert body at the first axial side.

13. A drilling tool comprising:
an elongated tool body extending along a drill axis, wherein the tool body includes at least two chip flutes and one axial end portion provided with a peripherally arranged first insert seat and a centrally arranged second insert seat; and
a cutting insert arranged in the first insert seat, the cutting insert comprising an insert body having a central longitudinal axis extending along a longitudinal direction of the insert body and an imaginary centre plane-including the central longitudinal axis, the insert body having a pointed shape substantially in the longitudinal direction, and being defined by a top surface, a bottom surface, and a circumferential surface extending between the top surface and the bottom surface, wherein the insert body at the top surface includes a first rake face and the bottom surface includes a second rake face, the insert body at the circumferential surface including a first radial side and a second radial side extending in the longitudinal direction on opposite sides of the insert body, the first radial side and the second radial side being parallel and each extending between the top and bottom surfaces and perpendicular to the centre plane, and a first axial side and a second axial side extending across the longitudinal direction on opposite sides of the insert body, and wherein the insert body includes a first cutting edge extending along a rim portion at an intersection between the first rake face and the first axial side, and a second cutting edge extending along a rim portion at an intersection between the second rake face and the first axial side, wherein the first cutting edge includes a first edge portion and a second edge portion extending at an obtuse angle to each other, and the second cutting edge includes a third edge portion and a fourth edge portion extending at an obtuse angle to each other, the first, second, third, and fourth edge portions forming said pointed shape, the first axial side including a first relief face and a second relief face, the first relief face extending along the first rake face on one side of the imaginary centre plane and the second relief face extending along the second rake face on an opposite side of the imaginary centre plane, wherein the first relief face forms an obtuse angle with the centre plane, such that the insert body is longer in the longitudinal direction at the first cutting edge than adjacent to the centre plane, and wherein the second relief face forms an obtuse angle with the centre plane, such that the insert body is longer in the longitudinal direction at the second cutting edge than adjacent to the centre plane, and wherein as seen in a view perpendicular to the imaginary centre plane, a first corner portion disposed between the first and second edge portions is arranged on one side of the central longitudinal axis and a second corner portion disposed between the third and fourth edge portions is arranged on an opposite side of the central longitudinal axis.

14. The drilling tool according to claim 13, wherein the first insert seat is provided with a tangential support surface, a radial support surface, and an axial support surface, and wherein the tangential support surface extends from a first end portion at said one axial end portion of the insert body to a second end portion at the axial support surface of the first insert seat, and wherein, as seen in a cutting direction of the drilling tool, the second end portion extends ahead of the first end portion, such that the centre plane of the cutting insert extends at an angle of approximately 3 degrees to the drill axis.

15. The drilling tool according to claim 13, wherein a drilling length of the drilling tool is up to 7 times a drilling diameter of the drilling tool.

16. The drilling tool according to claim 13, wherein a drilling diameter of the drilling tool is within a range of 15-65.

* * * * *